(12) United States Patent
Murai et al.

(10) Patent No.: US 11,976,729 B2
(45) Date of Patent: May 7, 2024

(54) SHAFT SEALING STRUCTURE

(71) Applicant: SMC CORPORATION, Tokyo (JP)

(72) Inventors: Takayuki Murai, Moriya (JP); Takashi Arakawa, Nagareyama (JP)

(73) Assignee: SMC CORPORATION, Tokyo (JP)

( * ) Notice: Subject to any disclaimer, the term of this patent is extended or adjusted under 35 U.S.C. 154(b) by 30 days.

(21) Appl. No.: 17/655,592

(22) Filed: Mar. 21, 2022

(65) Prior Publication Data

US 2022/0307600 A1    Sep. 29, 2022

(30) Foreign Application Priority Data

Mar. 23, 2021 (JP) ................................ 2021-048030
Jan. 12, 2022 (JP) ................................ 2022-002691

(51) Int. Cl.
| | |
|---|---|
| *F16J 15/3236* | (2016.01) |
| *F16J 15/18* | (2006.01) |
| *F16J 15/20* | (2006.01) |
| *F16J 15/3272* | (2016.01) |

(52) U.S. Cl.
CPC ............ *F16J 15/20* (2013.01); *F16J 15/188* (2013.01); *F16J 15/3236* (2013.01); *F16J 15/3272* (2013.01)

(58) Field of Classification Search
CPC .... F16J 15/3272; F16J 15/3236; F16J 15/188; F16J 15/20
See application file for complete search history.

(56) References Cited

U.S. PATENT DOCUMENTS

| | | | |
|---|---|---|---|
| 1,246,089 A | 11/1917 | Greenoe | |
| 2,442,687 A | 6/1948 | Heathcott | |
| 2,521,692 A * | 9/1950 | Costello | ................ F16K 41/02 |
| | | | 277/530 |
| 2,706,655 A * | 4/1955 | Showalter | ............... F16J 15/20 |
| | | | 277/529 |
| 3,790,179 A | 2/1974 | Scannell | |
| 3,833,228 A * | 9/1974 | Gilliam, Sr. | ............ F16J 15/20 |
| | | | 277/530 |

(Continued)

FOREIGN PATENT DOCUMENTS

| | | |
|---|---|---|
| EP | 0 308 390 A1 | 3/1989 |
| JP | 03-096468 U | 10/1991 |

(Continued)

OTHER PUBLICATIONS

Extended European Search Report dated Aug. 18, 2022 in European Patent Application No. 22163253.2, citing references 1-4 and 15 therein, 9 pages.

(Continued)

*Primary Examiner* — Eugene G Byrd
(74) *Attorney, Agent, or Firm* — Oblon, McClelland, Maier & Neustadt, L.L.P.

(57) ABSTRACT

A shaft sealing structure includes a plurality of V-packings that are stacked in multiple stages, and each of the V-packings is formed of a thick-walled annular top portion, a thin-walled inner side skirt portion, and a thin-walled outer side skirt portion. Adjacent ones of the top portions abut against each other, adjacent ones of the inner side skirt portions do not interfere with each other, and adjacent ones of the outer side skirt portions do not interfere with each other.

15 Claims, 8 Drawing Sheets

(56) References Cited

U.S. PATENT DOCUMENTS

| | | | | |
|---|---|---|---|---|
| 4,398,731 A | * | 8/1983 | Gorman | F16J 15/22 |
| | | | | 277/584 |
| 4,576,385 A | * | 3/1986 | Ungchusri | F16J 15/184 |
| | | | | 277/540 |
| 5,056,757 A | | 10/1991 | Wood | |
| 6,302,402 B1 | * | 10/2001 | Rynders | F16J 15/0887 |
| | | | | 277/653 |
| 2002/0074739 A1 | * | 6/2002 | Mattina | F16J 15/20 |
| | | | | 277/603 |
| 2010/0007097 A1 | * | 1/2010 | Sundararajan | F16J 15/0887 |
| | | | | 29/592 |
| 2012/0061922 A1 | | 3/2012 | Whitlow et al. | |

FOREIGN PATENT DOCUMENTS

| | | |
|---|---|---|
| JP | 04-049282 U | 4/1992 |
| JP | 4-258588 A | 9/1992 |

OTHER PUBLICATIONS

Japanese Office Action dated Jul. 4, 2023 in Japanese Patent Application No. 2022-002691 (with English Translation), citing reference 15 therein, 14 pages.

\* cited by examiner

SHAFT SEALING STRUCTURE

CROSS-REFERENCE TO RELATED APPLICATIONS

This application is based upon and claims the benefit of priority from Japanese Patent Applications No. 2021-048030 filed on Mar. 23, 2021, and No. 2022-002691 filed on Jan. 12, 2022, the contents all of which are incorporated herein by reference.

BACKGROUND OF THE INVENTION

Field of the Invention

The present invention relates to a shaft sealing structure arranged on a sliding portion of a rod.

Description of the Related Art

Conventionally, a technology has been known in which a shaft seal formed of V-packings are arranged between a rod operating within a liquid such as a chemical or steam, and a body in which the rod is accommodated. For example, in JP H04-049282 U, as a valve rod seal for providing sealing between a valve rod and a valve body, a structure is disclosed in which a V-packing made of a fluorine rubber is sandwiched between V-packings made of a fluorine resin. Consequently, attempts are being undertaken to secure a wider range of sealing performance from low temperatures to high temperatures. Such V-packings are pressed strongly against the valve rod and the valve body due to a reaction force of the spring.

Further, for example, in JP H03-096468 U, as packings that are mounted between a piston and a cylinder head of a fluid pressure feeding device, a structure is disclosed in which V-packings made of a fluorine resin are stacked in multiple stages. In each of the V-packings, the thickness of the top portion thereof is thinner than that of the other portions, and a rear side apex angle thereof is smaller than a front side apex angle. When the V-packings are stacked in multiple stages and pressed together, an amount by which the V-packings protrude to an outer side can be increased, and an effect of preventing liquid leakage can be stably obtained.

SUMMARY OF THE INVENTION

However, the V-packings of this type which are stacked in multiple stages are formed with a structure in which the sealing portions of the packings are strongly pressed against a target member while being mutually pressed in contact with each other, which results in a large amount of wear on the sealing portions. Further, wearing of all of the V-packings progresses simultaneously. Therefore, there is a concern that the useful lifetime of the shaft seal may be shortened.

The present invention has the object of solving the aforementioned problem.

A shaft sealing structure according to the present invention is arranged between a rod configured to be driven within a predetermined fluid and move in an axial direction, and a holder in which the rod is accommodated, the shaft sealing structure comprising a plurality of V-packings stacked in multiple stages. Each of the V-packings is formed of a top portion formed to be thick-walled and having an annular shape, an inner side skirt portion formed to be thin-walled and extending diagonally inward from the top portion, and an outer side skirt portion formed to be thin-walled and extending diagonally outward from the top portion. The inner side skirt portion slidably contacts an outer surface of the rod at a distal end of the inner side skirt portion, and the outer side skirt portion abuts against an inner surface of the holder at a distal end of the outer side skirt portion. Adjacent ones of the top portions abut against each other, adjacent ones of the inner side skirt portions do not interfere with each other, and adjacent ones of the outer side skirt portions do not interfere with each other.

Further, a shaft sealing structure according to the present invention is arranged between a rod configured to be driven within a predetermined fluid and move in an axial direction, and a holder in which the rod is accommodated, the shaft sealing structure comprising a plurality of U-packings stacked in multiple stages. Each of the U-packings is formed of a top portion formed to be thick-walled and having an annular shape, an inner side skirt portion formed to be thin-walled and extending inwardly and in an axial direction from the top portion, and an outer side skirt portion formed to be thin-walled and extending outwardly and in the axial direction from the top portion. The inner side skirt portion includes a rib configured to slidably contact an outer surface of the rod, and the outer side skirt portion includes a rib configured to abut against an inner surface of the holder. Adjacent ones of the top portions abut against each other, adjacent ones of the inner side skirt portions do not interfere with each other, and adjacent ones of the outer side skirt portions do not interfere with each other.

In accordance with the above-described shaft sealing structures, by the inner side skirt portions and the outer side skirt portions receiving a fluid pressure and being elastically deformed thereby, the V-packings or the U-packings can exhibit satisfactory sealing performance. Further, since wearing of the plurality of V-packings or the plurality of U-packings does not progress simultaneously, satisfactory sealing performance can be maintained over a prolonged period of time.

The shaft sealing structures according to the present invention include the plurality of V-packings or the plurality of U-packings that are formed of the thick-walled top portion, the thin-walled inner side skirt portion, and the thin-walled outer side skirt portion, wherein the adjacent ones of the inner side skirt portions do not interfere with each other, and the adjacent ones of the outer side skirt portions do not interfere with each other. Therefore, satisfactory sealing performance can be maintained over a prolonged period of time.

The above and other objects, features, and advantages of the present invention will become more apparent from the following description when taken in conjunction with the accompanying drawings, in which preferred embodiments of the present invention are shown by way of illustrative example.

DESCRIPTION OF THE INVENTION

Figure 1:
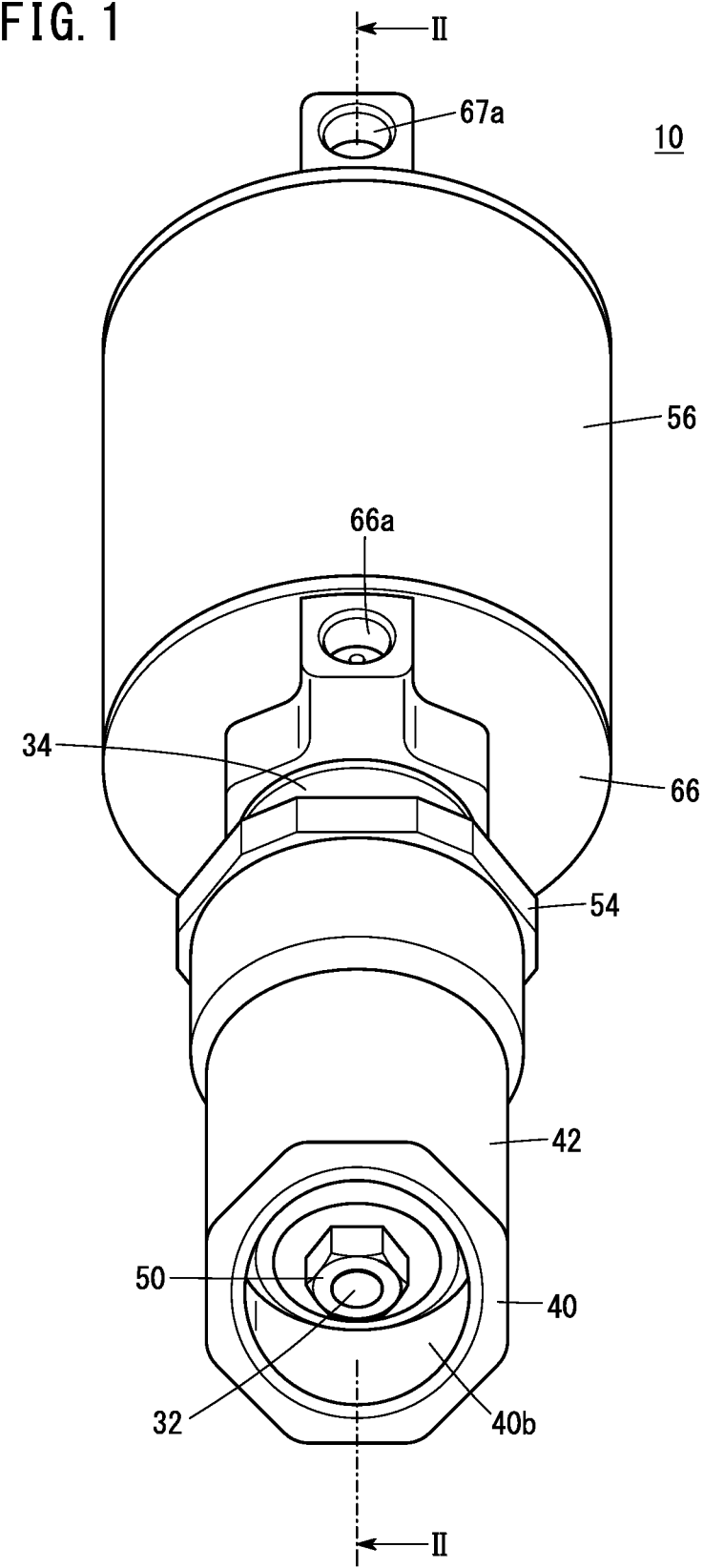
FIG. 1 is an external view of an angle seat valve in which a shaft sealing structure according to a first embodiment of the present invention is adopted.

In the following description, when terms related to upper and lower directions are used, such terms refer to directions on the drawing, and the upper directions including the meaning of "diagonally up" are simply referred to as "up (upper)," whereas the lower directions including the meaning of "diagonally low" are simply referred to as "low (lower)".

First Embodiment

Figure 2:
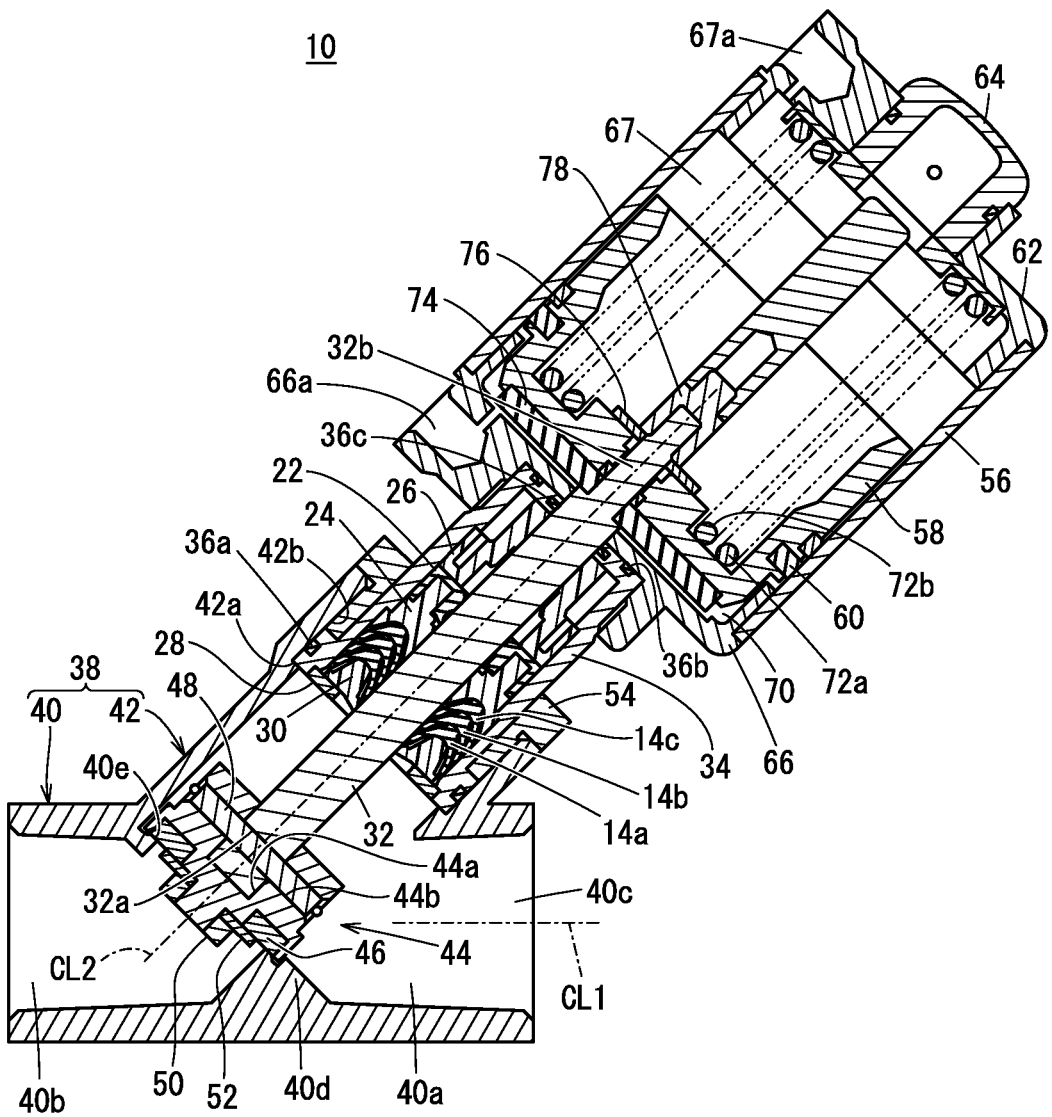
FIG. 2 is a cross-sectional view taken along line II-II of the angle seat valve shown in FIG. 1.
Figure 3:
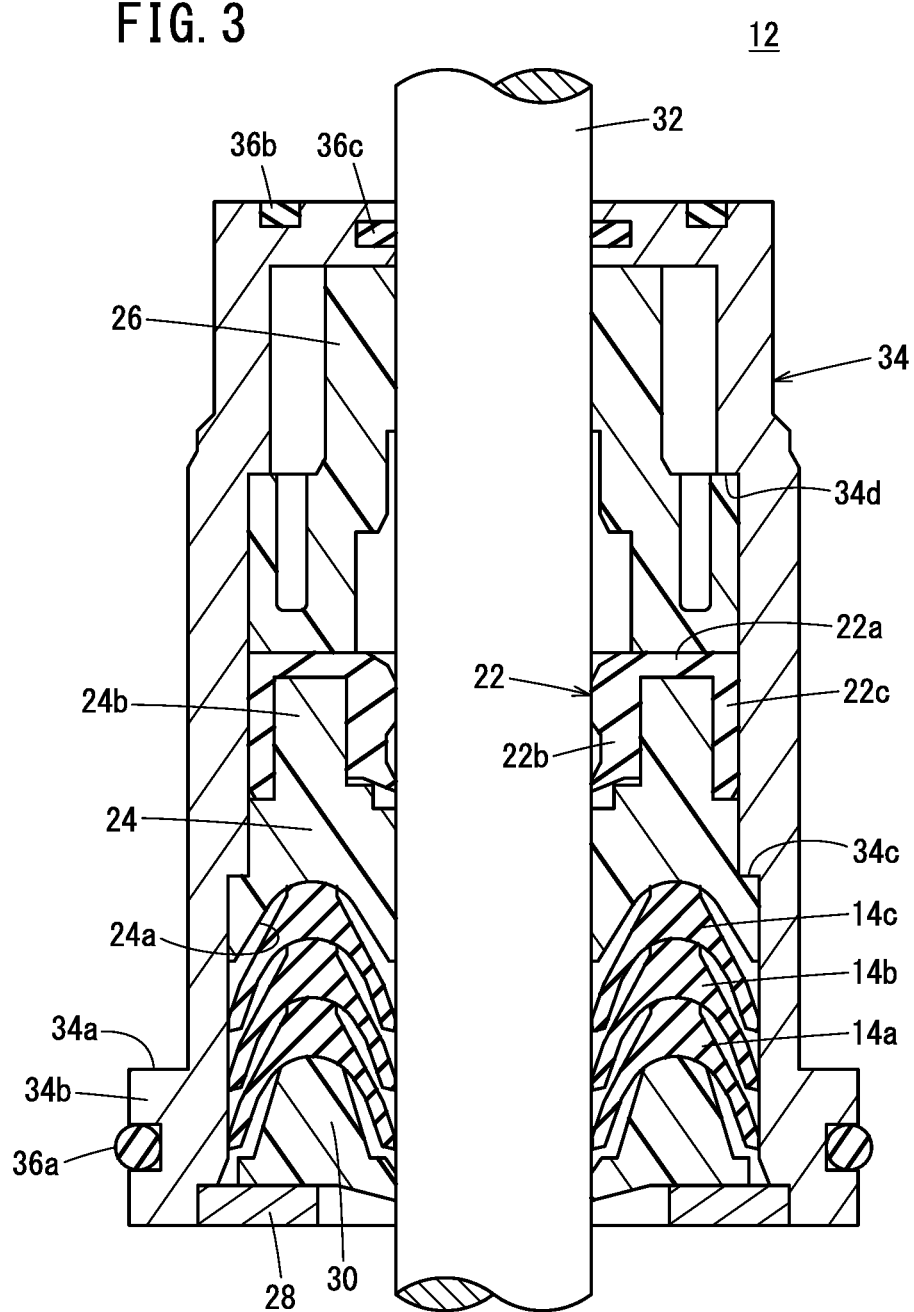
FIG. 3 is an enlarged view of the shaft sealing structure in the angle seat valve shown in FIG. 2.

A shaft sealing structure 12 according to a first embodiment of the present invention will be described with reference to FIGS. 1 to 5. In FIGS. 1 and 2, an angle seat valve 10 is shown in which the shaft sealing structure 12 is adopted. The angle seat valve 10 is used, for example, in order to control flowing of a fluid such as a chemical solution for cleaning a beverage container, or steam for carrying out steam sterilization on medical equipment or the like (hereinafter, simply referred to as a "fluid"). The angle seat valve 10 is particularly suitable for controlling a large flow rate. The angle seat valve 10 includes a valve mechanism unit and a drive mechanism unit. The valve mechanism unit is equipped with a valve body 38 and a valve rod (rod) 32. The drive mechanism unit includes a cylinder tube 56 and a piston 58.

The valve body 38 includes a straight tubular shaped main pipe portion 40 having a fluid passage 40a in the interior thereof, and an inclined pipe portion 42 that diagonally intersects the main pipe portion 40. The inclined pipe portion 42 is formed integrally with the main pipe portion 40. An axis CL2 of the inclined pipe portion 42 intersects an axis CL1 of the main pipe portion 40 at a predetermined angle (for example, 45 degrees). One end part of the main pipe portion 40 is equipped with an inlet port 40b, and another end part of the main pipe portion 40 is equipped with an outlet port 40c. The interior of the inclined pipe portion 42 is connected to the fluid passage 40a of the main pipe portion 40.

A bottom wall of the main pipe portion 40 includes a raised portion 40d thereon that protrudes toward the inclined pipe portion 42. The valve body 38 includes an annular valve seat 40e, which extends from an inner wall of the valve body 38 at a portion where the main pipe portion 40 and the inclined pipe portion 42 intersect each other at an obtuse angle, to the raised portion 40d. The valve seat 40e constitutes an annular sealing surface disposed perpendicularly to the axis CL2 of the inclined pipe portion 42.

A bottomed cylindrical holder 34 is attached to an upper part of the inclined pipe portion 42. Specifically, a large-diameter hole portion 42b having a female screw thread thereon is formed on an upper inner circumference of the inclined pipe portion 42 via a stepped portion 42a. A large diameter part 34b is formed on a lower outer circumference of the holder 34 via a first stepped portion 34a (see FIG. 3).

The holder 34 is fitted into the large diameter hole portion 42b of the inclined pipe portion 42 until reaching a position where the large diameter part 34b of the holder 34 abuts against the stepped portion 42a of the inclined pipe portion 42. Thereafter, a fixing cylindrical body 54 having a male screw thread thereon is inserted from an upper side of the inclined pipe portion 42 between the holder 34 and the inclined pipe portion 42. Then, the fixing cylindrical body 54 is screwed-engaged with the inclined pipe portion 42, and a distal end of the fixing cylindrical body 54 abuts against the first stepped portion 34a of the holder 34, whereby the holder 34 is fixed to the inclined pipe portion 42. A sealing material 36a, which is placed in contact with a wall surface of the large diameter hole portion 42b of the inclined pipe portion 42, is mounted on the large diameter part 34b of the holder 34.

An upper part of the holder 34 extends upwardly from the inclined pipe portion 42, and a later-described rod cover 66 is attached to an end part thereof. A first guide bush 24 and a second guide bush 26 are attached to an inner circumference of the holder 34. The first guide bush 24 and the second guide bush 26 guide the valve rod 32 so as to be capable of moving in an axial direction. A pressing plate 28 is attached to a lower end of the holder 34. A scraper 30 and a plurality of V-packings 14a to 14c are mounted between the pressing plate 28 and the first guide bush 24. An auxiliary packing 22 is mounted between the first guide bush 24 and the second guide bush 26. A description will be given later concerning the details of the shaft sealing structure 12.

A valve element 44 which is capable of abutting against the valve seat 40e is connected to a lower end part of the valve rod 32. Specifically, the valve element 44 includes an upwardly opening bottomed hole portion 44a and a pair of pin holes 44b. The hole portion 44a extends along the axis CL2 of the valve element 44 (in common with the axis of the inclined pipe portion 42). Each of the pin holes 44b extends in a direction perpendicular to the axis CL2 of the valve element 44, and opens on a wall surface of the hole portion 44a and a side surface of the valve element 44. On the other hand, the lower end part of the valve rod 32 includes a pin hole 32a. The pin hole 32a extends in a direction perpendicular to the axis CL2 of the valve rod 32, and penetrates in a lateral direction through the valve rod 32. By the lower end part of the valve rod 32 being inserted into the hole portion 44a of the valve element 44, and a connecting pin 48 being press-fitted into the pair of pin holes 44b of the valve element 44 and the pin hole 32a of the valve rod 32, the valve element 44 is fixed to the valve rod 32.

The valve element 44 is arranged inside the inclined pipe portion 42. When the valve element 44 is moved to a lowermost end together with the valve rod 32, a seal member 46 which is mounted on the valve element 44 is placed in contact with the valve seat 40e, and communication between the inlet port 40b and the outlet port 40c is interrupted. The direction in which the valve element 44 moves is inclined at a predetermined angle with respect to the direction in which the fluid flows from the inlet port 40b toward the outlet port 40c. Moreover, it should be noted that the members indicated by the reference numerals 50 and 52 are a nut and a washer for fixing the seal member 46 to the valve element 44.

The valve rod 32 is inserted into the first guide bush 24 and the second guide bush 26, and extends upwardly from the holder 34. An upper end part of the valve rod 32 is reduced in diameter, and is formed with a small diameter part 32b having a male screw thread formed on a distal end thereof. A reinforcing plate 74, the piston 58, and a washer 76 are inserted over the small diameter part 32b of the valve rod 32, and a connecting rod 78 is screw-engaged with the small diameter part 32b from an outer side thereof, whereby the piston 58 is attached to the upper end part of the valve rod 32.

The piston 58 is arranged inside the cylindrical cylinder tube 56. The upper end side of the cylinder tube 56 is closed by a head cover 62 and a cap 64. The lower end side of the cylinder tube 56 is closed by the rod cover 66. A pressure chamber 70 into which air pressure can be introduced exists between the piston 58 and the rod cover 66. Supplying and discharging of air to and from the pressure chamber 70 is carried out via a supply and discharge port 66a of the rod cover 66. Moreover, the reference numeral 67a indicates a port for discharging air or the like within a chamber 67 that exists between the piston 58 and the head cover 62.

A pair of springs 72a and 72b that bias the piston 58 downward are arranged between the piston 58 and the head cover 62. A piston packing 60 in sliding contact with the cylinder tube 56 is mounted on an outer circumference of the piston 58. Further, a sealing material 36b, which abuts against the rod cover 66, and a sealing material 36c, which is in sliding contact with the valve rod 32, are mounted on the holder 34. Due to such sealing materials, the pressure chamber 70 is maintained in an airtight state from the exterior, and the pressure chamber 70 is maintained in an airtight state from an internal space of the holder 34.

When air is introduced into the pressure chamber 70, the piston 58 is driven upward in opposition to a biasing force of the springs 72a and 72b, and the valve rod 32 and the valve element 44 are moved upward. On the other hand, when the air in the pressure chamber 70 is discharged, the piston 58 is driven downward by the biasing force of the springs 72a and 72b, and the valve rod 32 and the valve element 44 are moved downward. By adjusting the pressure of the air introduced into the pressure chamber 70, the position of the piston 58 can be changed, and in accordance therewith, the degree at which the valve element 44 is opened can be adjusted.

(Details of the Shaft Sealing Structure 12)

Figure 4:
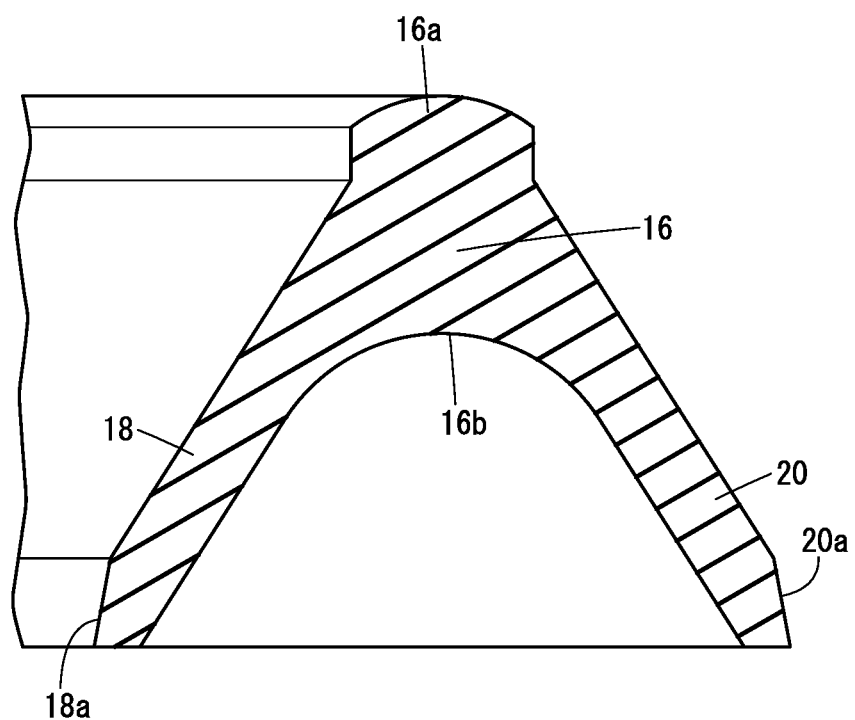
FIG. 4 is a cross-sectional view of a V-packing in the shaft sealing structure shown in FIG. 3.
Figure 5:
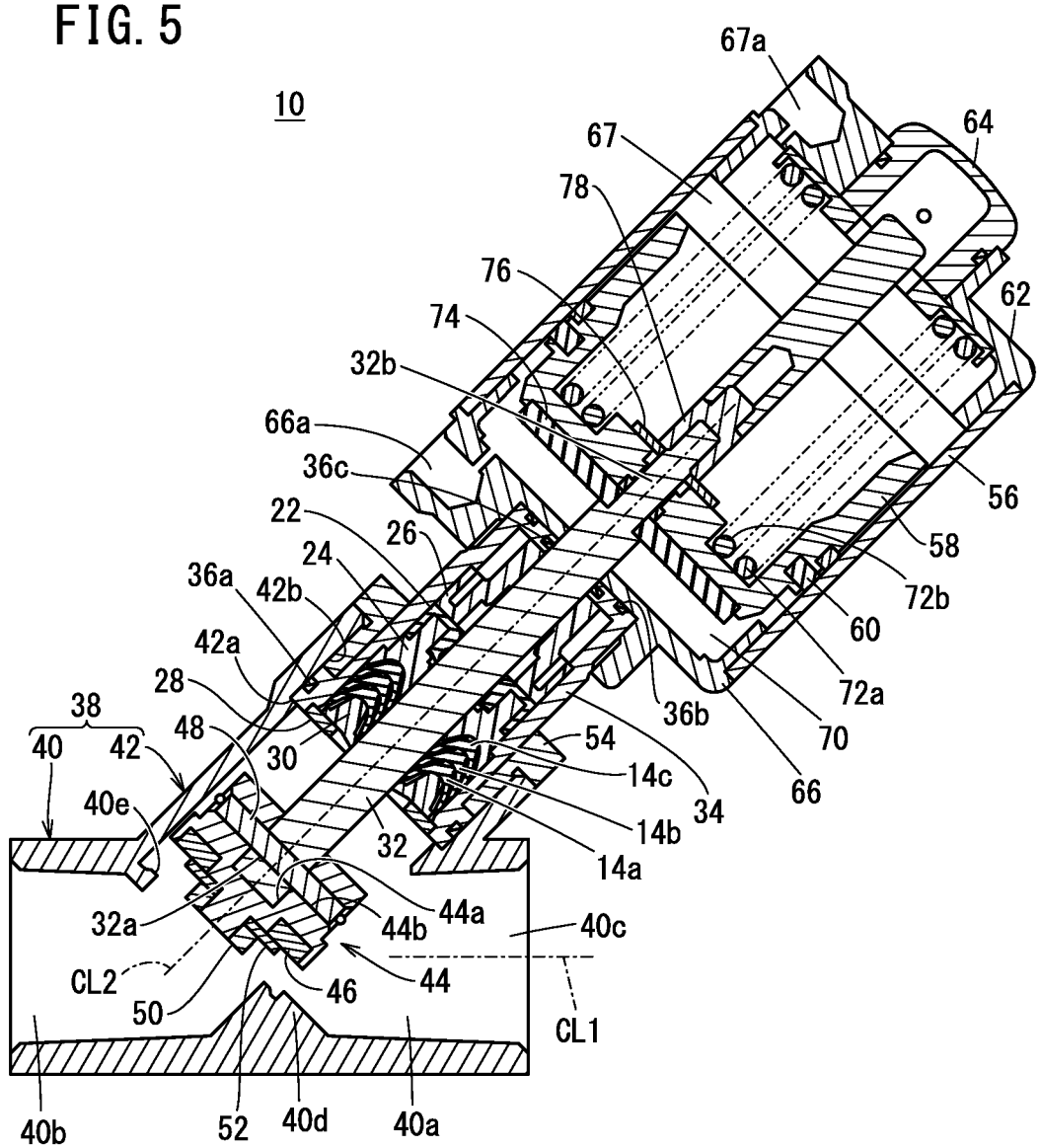
FIG. 5 is a view corresponding to FIG. 2 at a time when the angle seat valve shown in FIG. 1 is in a predetermined operational state.

The V-packings 14a to 14c are made of a fluorine resin, and are superior in chemical resistance and steam resistance. As shown in FIG. 4, each of the V-packings 14a to 14c, which are V-shaped in cross section, includes a thick-walled top portion 16, a thin-walled inner side skirt portion 18 extending diagonally inward from the top portion 16, and a thin-walled outer side skirt portion 20 extending diagonally outward from the top portion 16. The top portion 16 includes an annular convex portion 16a that protrudes to a side opposite to the inner side skirt portion 18 and the outer side skirt portion 20. The plurality of V-packings 14a to 14c are arranged in such a manner that the respective top portions 16 thereof are positioned away from the valve element 44, and the V-packings 14a to 14c are stacked in a direction of the axis CL2 of the valve rod 32 (in common with the axis of the inclined pipe portion 42).

The top portions 16 of adjacent ones of the V-packings 14a to 14c abut against each other by the convex portion 16a of one of the adjacent top portions 16 abutting against a rear surface 16b of the other of the adjacent top portions 16. On the other hand, the inner side skirt portions 18 and the outer side skirt portions 20 of the adjacent ones of the V-packings 14a to 14c face each other with gaps therebetween, and do not interfere with each other. The inner side skirt portions 18 of the V-packings 14a to 14c slidably contact an outer surface of the valve rod 32 at distal end inner circumferential portions 18a thereof. Further, the outer side skirt portions 20 of the V-packings 14a to 14c abut against an inner surface of the holder 34 at distal end outer circumferential portions 20a thereof.

According to the present embodiment, although a total of three V-packings 14a to 14c are provided including a lower V-packing 14a, a middle V-packing 14b, and an upper V-packing 14c, the number of the V-packings is not necessarily limited to this feature.

The auxiliary packing 22 is made of a rubber material such as FKM, and is superior in sealing performance. The auxiliary packing 22, which is U-shaped in cross-section, includes an annular plate portion 22a, an inner side cylindrical portion 22b that extends from an inner circumferential portion of the annular plate portion 22a, and an outer side cylindrical portion 22c that extends from an outer circumferential portion of the annular plate portion 22a. The inner side cylindrical portion 22b of the auxiliary packing 22 slidably contacts the outer surface of the valve rod 32 on the inner circumference thereof. The outer side cylindrical portion 22c of the auxiliary packing 22 abuts against the inner surface of the holder 34 on the outer circumference thereof.

The first guide bush 24, which is made of a resin such as PPS, is caught and positioned by a second stepped portion 34c provided on the inner circumference of the holder 34. The first guide bush 24 is equipped with a recessed portion 24a in which the upper V-packing 14c is accommodated, and abuts against the convex portion 16a of the upper V-packing 14c on the bottom surface of the recessed portion 24a. Further, the first guide bush 24 is equipped with a protruding portion 24b which enters between the inner side cylindrical portion 22b and the outer side cylindrical portion 22c of the auxiliary packing 22.

The second guide bush 26, which is made of a resin such as PPS, is caught and positioned by a third stepped portion 34d provided on the inner circumference of the holder 34. A lower end surface of the second guide bush 26 abuts against the annular plate portion 22a of the auxiliary packing 22. The scraper 30 for removing foreign material, is made of a resin such as PEEK, and is positioned by the pressing plate 28. A top portion of the scraper 30 abuts against the rear surface 16b of the top portion 16 of the lower V-packing 14a. The plurality of V-packings 14a to 14c are sandwiched between the scraper 30 and the first guide bush 24, and the adjacent ones of the top portions 16 are pressed against each other.

The angle seat valve 10, which includes the shaft sealing structure 12 in which the plurality of V-packings 14a to 14c and the auxiliary packing 22 are included, is configured in the manner described above. Next, a description will be given concerning actions and operations of the angle seat valve 10.

As shown in FIG. 2, a state in which the seal member 46 of the valve element 44 is placed in contact with the valve seat 40e is defined as an initial state. In the initial state, air is not introduced into the pressure chamber 70, and the piston 58 is positioned at the lowermost end due to the biasing force of the springs 72a and 72b. In this instance, when fluid is supplied to the inlet port 40b of the valve body 38, the fluid pressure acts on a lower end surface of the valve element 44. However, since the biasing force of the springs 72a and 72b is greater than the force of the fluid pressure that presses the valve element 44 upward, the valve element 44 does not move.

In this state, a non-illustrated switching valve is operated, and air is supplied from the supply and discharge port 66a to the pressure chamber 70. Upon doing so, a force that presses the piston 58 upward by the air pressure acting on the piston 58 exceeds the biasing force of the springs 72*a* and 72*b*, and the piston 58 moves upward. Then, the piston 58 moves to a position where the force that presses the piston 58 upward by the air pressure accumulated in the pressure chamber 70 and the force that presses the piston 58 downward by the reaction force of the contracted springs 72*a* and 72*b* are in balance (refer to FIG. 5). Moreover, strictly speaking, as the force that presses the piston 58 upward, there is included a force obtained by multiplying the pressure of the fluid acting on the valve element 44 by the cross-sectional area of the valve rod 32.

In this manner, the valve element 44 separates away from the valve seat 40*e*, and the fluid supplied from the inlet port 40*b* is discharged from the outlet port 40*c* at a flow rate corresponding to the distance between the valve element 44 and the valve seat 40*e* separated from each other. Thereafter, the switching valve is operated, and the air in the pressure chamber 70 is discharged to the exterior from the supply and discharge port 66*a*. Upon doing so, the piston 58 moves to the lowermost end due to the biasing force of the springs 72*a* and 72*b*, and the seal member 46 of the valve element 44 is placed in contact with the valve seat 40*e*. Consequently, communication between the inlet port 40*b* and the outlet port 40*c* is interrupted, and discharging of the fluid from the outlet port 40*c* is stopped.

The fluid supplied from the inlet port 40*b* fills the inclined pipe portion 42 each time that the valve element 44 separates away from the valve seat 40*e*. By the shaft sealing structure 12 in which the plurality of V-packings 14*a* to 14*c* and the auxiliary packing 22 are included, the fluid inside the inclined pipe portion 42 is prevented from leaking out to the exterior.

More specifically, the lower V-packing 14*a* receives the pressure of the fluid inside the inclined pipe portion 42, the thin-walled inner side skirt portion 18 is elastically deformed, and the pressure at which the distal end inner circumferential portion 18*a* abuts against the outer surface of the valve rod 32 increases. Further, the thin-walled outer side skirt portion 20 is elastically deformed, and the pressure at which the distal end outer circumferential portion 20*a* abuts against the inner surface of the holder 34 increases. Consequently, the lower V-packing 14*a* exhibits a high sealing performance, and the fluid in the inclined pipe portion 42 is effectively suppressed from passing through the lower V-packing 14*a*. In the case that a slight amount of fluid passes through the lower V-packing 14*a*, the auxiliary packing 22 prevents the fluid from leaking to the exterior.

When the angle seat valve 10 has been used over a certain period of time, wearing of the lower V-packing 14*a* progresses, whereby the lower V-packing 14*a* becomes incapable of exhibiting a sufficient sealing performance, and its role and functionality come to an end. When this happens, instead of the lower V-packing 14*a*, the middle V-packing 14*b*, which receives the pressure of the fluid inside the inclined pipe portion 42, becomes capable of exhibiting such a sealing performance. Furthermore, when the angle seat valve 10 has been used over a certain period of time, wearing of the middle V-packing 14*b* progresses. Then, instead of the middle V-packing 14*b*, the upper V-packing 14*c* becomes capable of exhibiting such a sealing performance. In this manner, the sealing action is sequentially handed over from the downwardly positioned V-packing to the upwardly positioned V-packing. It should be noted that wearing of the V-packings 14*a* to 14*c* progresses particularly at the distal end inner circumferential portions 18*a* of the inner side skirt portions 18 that repeatedly slide in contact with the reciprocating valve rod 32.

Since the inner side skirt portions 18 and the outer side skirt portions 20 of the V-packings 14*a* to 14*c* are formed to be thin-walled, they are easily elastically deformed when subjected to the pressure of the fluid inside the inclined pipe portion 42, and are capable of exhibiting satisfactory sealing performance. Further, since the adjacent ones of the V-packings 14*a* to 14*c* abut against each other at the top portions 16 which are formed to be thick-walled and have highly rigidity, the gaps between the inner side skirt portions 18 and the outer side skirt portions 20 of the adjacent ones of the V-packings 14*a* to 14*c* are reliably retained. In addition, since the inner side skirt portions 18 and the outer side skirt portions 20 of the adjacent ones of the V-packings 14*a* to 14*c* do not interfere with each other, wearing of the plurality of V-packings 14*a* to 14*c* does not progress simultaneously, and satisfactory sealing performance can be therefore maintained over a prolonged period of time.

The shaft sealing structure 12 according to the present embodiment includes the plurality of V-packings 14*a* to 14*c* that are formed of the thick-walled top portions 16, the thin-walled inner side skirt portions 18, and the thin-walled outer side skirt portions 20. In addition, since the adjacent ones of the inner side skirt portions 18 and the outer side skirt portions 20 do not interfere with each other, satisfactory sealing performance can be maintained over a prolonged period of time.

According to the present embodiment, although the V-packings 14*a* to 14*c* are made of a fluorine resin, the V-packings may be made of a resin other than a fluorine resin, rubber, an elastomer or the like, as long as the material has a predetermined elasticity. Further, in the case that the V-packings 14*a* to 14*c* are made of a fluorine resin, the auxiliary packing 22 which is made of a rubber material is useful for enhancing the sealing performance. For example, in the case that the V-packings 14*a* to 14*c* are made of a rubber material, the auxiliary packing 22 need not necessarily be provided. Although in describing the shaft sealing structure 12 according to the present embodiment, an example in which the shaft sealing structure 12 is applied to an angle seat valve for fluids such as a chemical solution and steam, the shaft sealing structure 12 can be applied to various devices (valves) for fluids such as compressed air.

Second Embodiment

Figure 6:
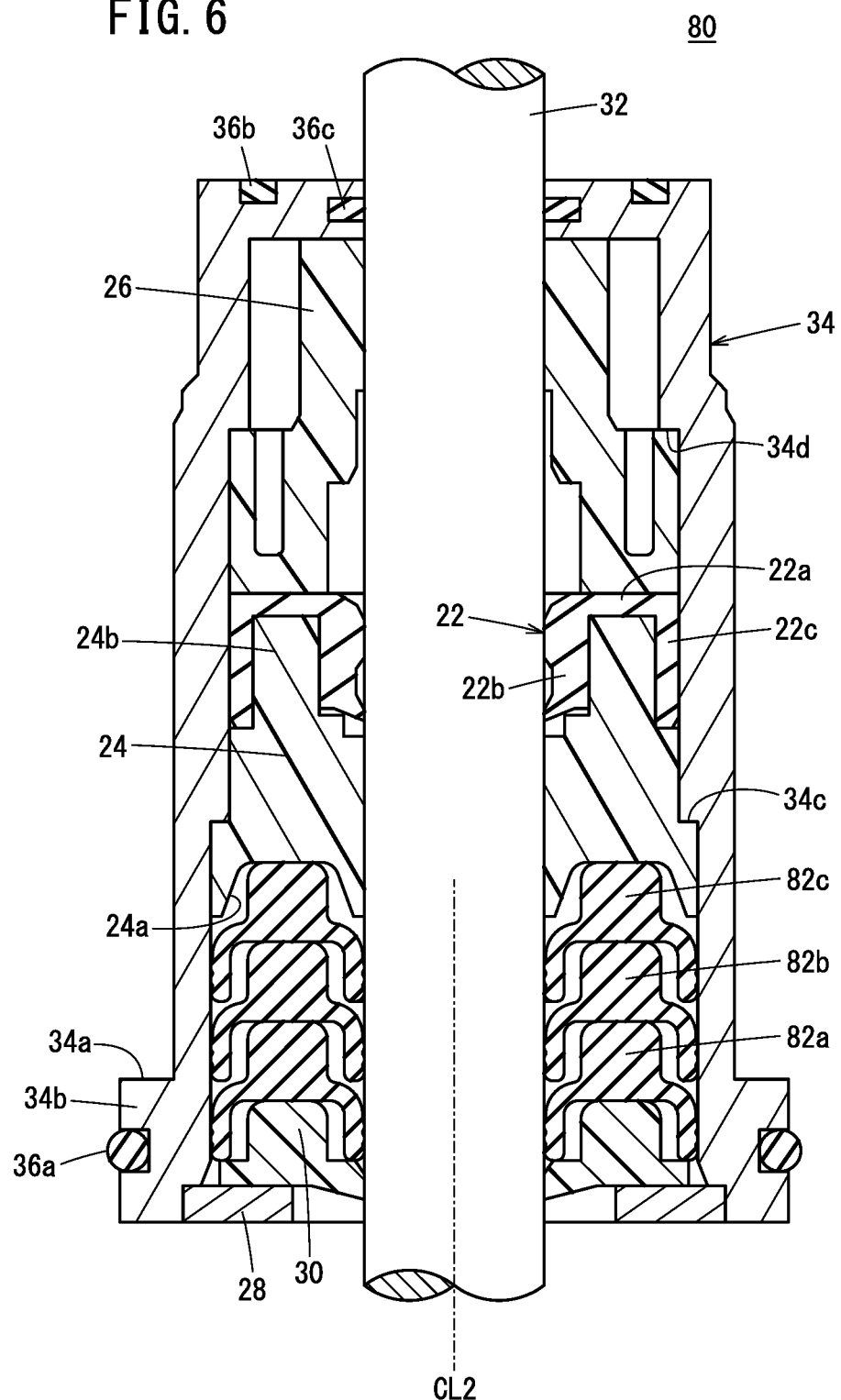
FIG. 6 is a view corresponding to FIG. 3 and showing a shaft sealing structure according to a second embodiment of the present invention.
Figure 7:
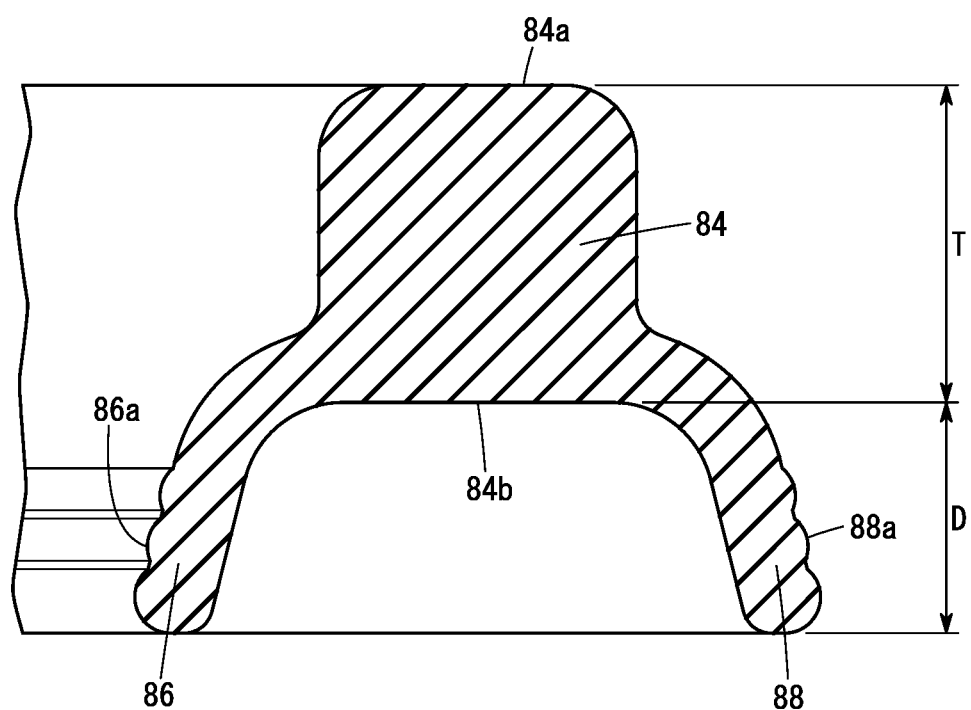
FIG. 7 is a cross-sectional view of a U-packing in the shaft sealing structure shown in FIG. 6.

A shaft sealing structure 80 according to a second embodiment of the present invention will be described with reference to FIGS. 6 and 7. The shaft sealing structure 80 will be described as being applied to the same angle seat valve 10 as in the first embodiment. Further, the same reference numerals designate the same or equivalent constituent elements as those of the shaft sealing structure 12 according to the first embodiment, and detailed description thereof is omitted.

The shaft sealing structure 80 includes a plurality of U-packings 82*a* to 82*c* made of a fluorine resin. As shown in FIG. 7, each of the U-packings 82*a* to 82*c*, which are U-shaped in cross section, includes a thick-walled top portion 84, a thin-walled inner side skirt portion 86 extending inwardly and in an axial direction from the top portion 84, and a thin-walled outer side skirt portion 88 extending outwardly and in the axial direction from the top portion 84. Moreover, the "axial direction" referred to herein is a direction parallel to a central axis of the U-packings 82*a* to 82*c* which coincides with the axis CL2 of the valve rod 32.

The plurality of U-packings 82*a* to 82*c* are arranged in such a manner that the respective top portions 84 thereof are positioned away from the valve element 44, and the U-packings 82a to 82c are stacked in a direction of the axis CL2 of the valve rod 32. According to the present embodiment, as shown in FIG. 6, although a total of three U-packings 82a to 82c are provided including a lower U-packing 82a, a middle U-packing 82b, and an upper U-packing 82c, the number of the U-packings is not necessarily limited to this feature.

The inner side skirt portion 86 of each of the U-packings 82a to 82c is provided with a plurality of inwardly protruding annular ribs 86a. The outer side skirt portion 88 of each of the U-packings 82a to 82c is provided with a plurality of outwardly protruding annular ribs 88a. The inner side skirt portions 86 and the outer side skirt portions 88, which are formed to be thin-walled, are elastically deformed when subjected to the pressure of the fluid inside the inclined pipe portion 42. Then, the inner side skirt portions 86 slidably contact the outer surface of the valve rod 32 at the distal ends of the plurality of ribs 86a. Further, the outer side skirt portions 88 abut against the inner surface of the holder 34 at the distal ends of the plurality of ribs 88a. Consequently, at the contact portions thereof, it is possible to secure a surface pressure and a contact area that are greater than or equal to a predetermined value, and satisfactory sealing performance can be exhibited.

Further, end surfaces 84a and rear surfaces 84b of the top portions 84 of the U-packings 82a to 82c are both flat surfaces. The top portions 84 of adjacent ones of the U-packings 82a to 82c abut against each other in a state in which the end surface 84a of one of the adjacent top portions 84 abuts against the rear surface 84b of the other of the adjacent top portions 84, in other words, the two flat surfaces abut against each other. Consequently, the central axes of the plurality of stacked U-packings 82a to 82c are stably kept coinciding with each other.

Further, the length in the axial direction of the top portions 84 of the U-packings 82a to 82c is longer than a distance from the rear surfaces 84b of the top portions 84 to the distal ends of the inner side skirt portions 86 or the distal ends of the outer side skirt portions 88. Stated otherwise, the thickness T of the top portions 84 is greater than the depth D of the recesses formed by the inner side skirt portions 86 and the outer side skirt portions 88. Consequently, the inner side skirt portions 86 and the outer side skirt portions 88 of the adjacent ones of the U-packings 82a to 82c do not interfere with each other.

When the angle seat valve 10 has been used over a certain period of time, wearing of the lower U-packing 82a progresses, whereby the lower U-packing 82a becomes incapable of exhibiting a sufficient sealing performance, and its role and functionality come to an end. When this happens, the middle U-packing 82b, which receives the pressure of the fluid inside the inclined pipe portion 42, becomes capable of exhibiting such a sealing performance. Furthermore, when the angle seat valve 10 has been used over a certain period of time, wearing of the middle U-packing 82b progresses. Then, the upper U-packing 82c becomes capable of exhibiting such a sealing performance. In this manner, the sealing action is sequentially handed over from the downwardly positioned U-packings to the upwardly positioned U-packings, and wearing of the plurality of U-packings 82a to 82c does not progress simultaneously.

The shaft sealing structure 80 according to the present embodiment includes the plurality of U-packings 82a to 82c that are formed of the thick-walled top portions 84, the thin-walled inner side skirt portions 86, and the thin-walled outer side skirt portions 88. In addition, since the adjacent ones of the inner side skirt portions 86 and the outer side skirt portions 88 do not interfere with each other, satisfactory sealing performance can be maintained over a prolonged period of time.

According to the present embodiment, although the U-packings 82a to 82c are made of a fluorine resin, the U-packings may be made of a resin other than a fluorine resin, rubber, an elastomer or the like, as long as the material has a predetermined elasticity.

Reference Example

Figure 8:
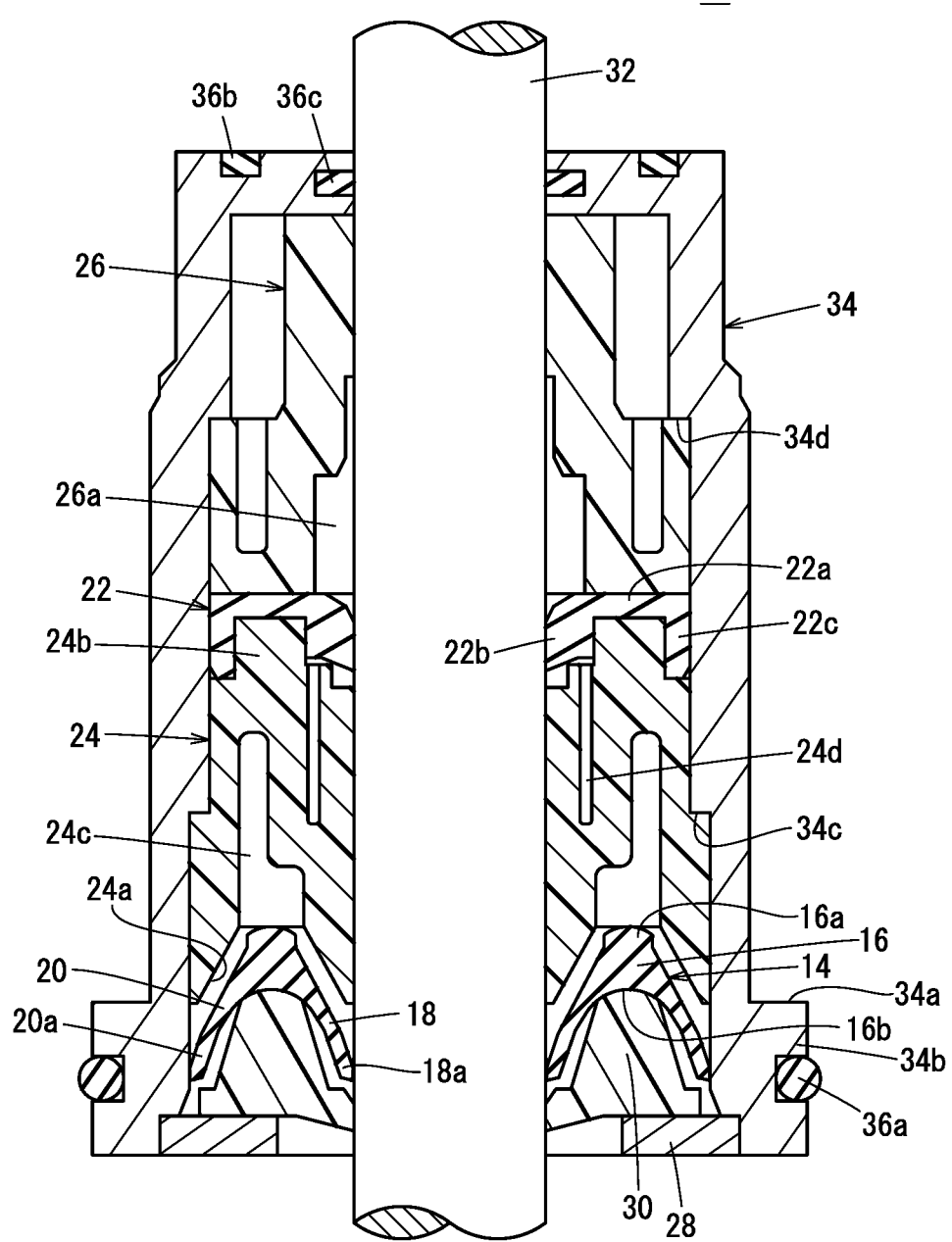
FIG. 8 is a cross-sectional view of a shaft sealing structure according to a reference example.

A shaft sealing structure 90 in the form of a reference example is shown in FIG. 8. This shaft sealing structure 90 differs from the shaft sealing structure 12 according to the first embodiment in that only one V-packing is provided therein. Moreover, the same reference numerals designate the same or equivalent constituent elements as those of the shaft sealing structure 12 according to the first embodiment. Hereinafter, a description will be given concerning the shaft sealing structure 90.

The first guide bush 24 and the second guide bush 26 are attached to the inner circumference of the holder 34. The first guide bush 24 and the second guide bush 26 guide the valve rod 32 so as to be capable of moving in an axial direction. The pressing plate 28 is attached to the lower end of the holder 34. The scraper 30 and the single V-packing 14 are mounted between the pressing plate 28 and the first guide bush 24. A rubber seal packing 22 is mounted between the first guide bush 24 and the second guide bush 26.

The V-packing 14 is made of a fluorine resin such as PTFE or PFA, and is superior in chemical resistance, heat resistance, and steam resistance. The V-packing 14, which is V-shaped in cross section, includes the top portion 16, the thin-walled inner side skirt portion 18 extending diagonally inward from the top portion 16, and the thin-walled outer side skirt portion 20 extending diagonally outward from the top portion 16. The top portion 16 includes the annular convex portion 16a that protrudes to a side opposite to the inner side skirt portion 18 and the outer side skirt portion 20. The inner side skirt portion 18 of the V-packing 14 slidably contacts the outer surface of the valve rod 32 at the distal end inner circumferential portion 18a thereof. The outer side skirt portion 20 of the V-packing 14 abuts against the inner surface of the holder 34 at the distal end outer circumferential portion 20a thereof.

The rubber seal packing 22 is made of a rubber material such as NBR, HNBR, EPDM, FKM, or silicone, and is superior in sealing performance. The rubber seal packing 22, which is U-shaped in cross-section, includes the annular plate portion 22a, the inner side cylindrical portion 22b that extends from the inner circumferential portion of the annular plate portion 22a, and the outer side cylindrical portion 22c that extends from the outer circumferential portion of the annular plate portion 22a. The inner side cylindrical portion 22b of the rubber seal packing 22 slidably contacts the outer surface of the valve rod 32 on the inner circumference thereof. The outer side cylindrical portion 22c of the rubber seal packing 22 abuts against the inner surface of the holder 34 on the outer circumference thereof.

The first guide bush 24 is made of a super engineering plastic material having a high mechanical strength, a high sliding ability, a heat resistance, and a low wear rate. As specific examples of such a super engineering plastic material, there may be cited PPS, PVDF, PA, PC, PE, POM, PEI, PPO, PET, PTFE, PEEK, PAI, PI, and PBI. The first guide bush 24 is caught by the second stepped portion 34c provided on the inner circumference of the holder 34. The first guide bush 24 is equipped with the recessed portion 24a in which the V-packing 14 is accommodated, and abuts against the convex portion 16a of the V-packing 14 on the bottom surface of the recessed portion 24a. Further, the first guide bush 24 is equipped with the protruding portion 24b which enters between the inner side cylindrical portion 22b and the outer side cylindrical portion 22c of the rubber seal packing 22.

The first guide bush 24 includes a plurality of first grease reservoirs 24c that open on the bottom surface of the recessed portion 24a, and an annular second grease reservoir 24d that opens toward the rubber seal packing 22. The plurality of first grease reservoirs 24c are uniformly arranged in the circumferential direction. The grease that is stored in the plurality of first grease reservoirs 24c is supplied to the V-packing 14. The grease that is stored in the second grease reservoir 24d is supplied to the rubber seal packing 22. Since the first guide bush 24 is disposed above the V-packing 14, the first guide bush 24 is protected from the fluid by the V-packing 14, and the durability thereof is enhanced.

The second guide bush 26 is made of a super engineering plastic material having a high mechanical strength, a high sliding ability, a heat resistance, and a low wear rate. The second guide bush 26 is caught by the third stepped portion 34d provided on the inner circumference of the holder 34. The lower end surface of the second guide bush 26 abuts against the annular plate portion 22a of the rubber seal packing 22. The second guide bush 26 includes a grease reservoir 26a on an inner circumferential surface thereof that faces the valve rod 32. Since the valve rod 32 is supported over a sufficient length by the first guide bush 24 and the second guide bush 26, the stability with which the valve rod 32 is supported is improved.

The scraper 30 is made of a super engineering plastic material having a heat resistance, a steam resistance, a chemical resistance, a high mechanical strength, a high sliding ability, and a low wear rate. The scraper 30 prevents foreign material such as sludge within the fluid that adheres to the valve rod 32 from entering the interior of the shaft sealing structure 90. The scraper 30 is positioned by the pressing plate 28. An upper end part of the scraper 30 abuts against the rear surface 16b of the top portion 16 of the V-packing 14.

The V-packing 14 is arranged between the first guide bush 24 and the scraper 30. The top portion 16 of the V-packing 14 is sandwiched between the bottom surface of the recessed portion 24a of the first guide bush 24 and the upper end part of the scraper 30. The inner side skirt portion 18 and the outer side skirt portion 20 of the V-packing 14 can be freely deformed inside a space formed between the first guide bush 24 and the scraper 30. Since the inner side skirt portion 18 and the outer side skirt portion 20 of the V-packing 14 are formed to be thin-walled, they are easily elastically deformed when subjected to the pressure of the fluid, and exhibit satisfactory sealing performance.

Since the shaft sealing structure 90 includes only one V-packing 14, the durability of the seal is somewhat inferior to that of the aforementioned shaft sealing structure 12 in which the plurality of V-packings 14a to 14c are included. However, the configuration in which the first guide bush 24 and the scraper 30 are included is useful in a similar manner as the aforementioned shaft sealing structure 12, and such a configuration is practical in consideration of cost effectiveness.

The present invention is not limited to the above-described embodiments, and various configurations can be adopted therein without departing from the essence and gist of the present invention.

What is claimed is:

1. A shaft sealing structure arranged between a rod configured to be driven within a predetermined fluid and move in an axial direction, and a holder in which the rod is accommodated, the shaft sealing structure comprising:
    a plurality of V-packings stacked in multiple stages, wherein
    each of the plurality of V-packings is formed of a top portion formed to be thick-walled and having an annular shape, an inner side skirt portion formed to be thin-walled and extending diagonally inward from the top portion, and an outer side skirt portion formed to be thin-walled and extending diagonally outward from the top portion,
    the inner side skirt portion slidably contacts an outer surface of the rod at a distal end of the inner side skirt portion, and the outer side skirt portion abuts against an inner surface of the holder at a distal end of the outer side skirt portion,
    in adjacent ones of the plurality of V-packings, the top portion of one of the adjacent V-packings and the top portion of another of the adjacent V-packings abut against each other, the inner side skirt portion of the one of the adjacent V-packings and the inner side skirt portion of the other of the adjacent V-packings do not interfere with each other, and the outer side skirt portion of the one of the adjacent V-packings and the outer side skirt portion of the other of the adjacent V-packings do not interfere with each other,
    the V-packings are made of a fluorine resin,
    a first guide bush and a second guide bush, both of said guide bushes being configured to guide the rod in a manner that the rod is movable in the axial direction is attached to the holder,
    a scraper is mounted between a pressing plate attached to the holder and the first guide bush, and the plurality of V-packings are mounted between the scraper and the first guide bush, and
    an auxiliary packing made of rubber mounted between the first guide bush and the second guide bush.

2. The shaft sealing structure according to claim 1, wherein the top portion includes a convex portion configured to protrude to a side opposite to the inner side skirt portion and the outer side skirt portion.

3. A shaft sealing structure arranged between a rod configured to be driven within a predetermined fluid and move in an axial direction, and a holder in which the rod is accommodated, the shaft sealing structure comprising:
    a plurality of U-packings stacked in multiple stages, wherein
    each of the plurality of U-packings is formed of a top portion formed to be thick-walled and having an annular shape, an inner side skirt portion formed to be thin-walled and extending inwardly and in an axial direction from the top portion, and an outer side skirt portion formed to be thin-walled and extending outwardly and in the axial direction from the top portion,
    the inner side skirt portion includes a rib configured to slidably contact an outer surface of the rod, and the outer side skirt portion includes a rib configured to abut against an inner surface of the holder,
    in adjacent ones of the plurality of U-packings, the top portion of one of the adjacent U-packings and the top portion of another of the adjacent U-packings abut against each other, the inner side skirt portion of the one of the adjacent U-packings and the inner side skirt portion of the other of the adjacent U-packings do not interfere with each other, and the outer side skirt portion of the one of the adjacent U-packings and the outer side skirt portion of the other of the adjacent U-packings do not interfere with each other, the U-packings are made of a fluorine resin, a first guide bush and a second guide bush, both of said guide bushes being configured to guide the rod in a manner that the rod is movable in the axial direction is attached to the holder, a scraper is mounted between a pressing plate attached to the holder and the first guide bush, and the plurality of ti-packings are mounted between the scraper and the first guide bush, and an auxiliary packing made of rubber mounted between the first guide bush and the second guide bush.

4. The shaft sealing structure according to claim 3, wherein an end surface and a rear surface of the top portion are formed as flat surfaces.

5. The shaft sealing structure according to claim 4, wherein a thickness of the top portion is greater than a depth of a recessed portion formed by the inner side skirt portion and the outer side skirt portion.

6. A valve adopting a shaft sealing structure arranged between a rod configured to be driven within a predetermined fluid and move in an axial direction, and a holder in Which the rod is accommodated, the shaft sealing structure including:

a plurality of V-packings stacked in multiple stages, wherein each of the plurality of V-packings is formed of a top portion formed to be thick-walled and having an annular shape, an inner side skirt portion formed to be thin-walled and extending diagonally inward from the top portion, and an outer side skirt portion formed to be thin-walled and extending diagonally outward from the top portion, the inner side skirt portion slidably contacts an outer surface of the rod at a distal end of the inner side skirt portion, and the outer side skirt portion abuts against an inner surface of the holder at a distal end of the outer side skirt portion, in adjacent ones of the plurality of V-packings, the top portion of one of the adjacent V-packings and the top portion of another of the adjacent V-packings abut against each other, the inner side skirt portion of the one of the adjacent V-packings and the inner side skirt portion of the other of the adjacent V-packings do not interfere with each other, and the outer side skirt portion of the one of the adjacent V-packings and the outer side skirt portion of the other of the adjacent V-packings do not interfere with each other, the V-packings are made of a fluorine resin, a first guide bush and a second guide bush, both of said guide bushes being configured to guide the rod in a manner that the rod is movable in the axial direction is attached to the holder, and a scraper is mounted between a pressing plate attached to the holder and the first guide bush, and the plurality of V-packings are mounted between the scraper and the first guide bush, and an auxiliary packing made of rubber mounted between the first guide bush and the second guide bush.

7. A valve adopting a shaft sealing structure arranged between a rod configured to be driven within a predetermined fluid and move in an axial direction, and a holder in which the rod is accommodated, the shaft sealing structure including:

a plurality of U-packings stacked in multiple stages, wherein each of the plurality of U-packings is formed of a top portion formed to be thick-walled and having an annular shape, an inner side skirt portion formed to be thin-walled and extending inwardly and in an axial direction from the top portion, and an outer side skirt portion formed to be thin-walled and extending outwardly and in the axial direction from the top portion, the inner side skirt portion includes a rib configured to slidably contact an outer surface of the rod, and the outer side skirt portion includes a rib configured to abut against an inner surface of the holder, in adjacent ones of the plurality of U-packings, the top portion of one of the adjacent U-packings and the top portion of another of the adjacent U-packings abut against each other, the inner side skirt portion of the one of the adjacent U-packings and the inner side skirt portion of the other of the adjacent U-packings do not interfere with each other, and the outer side skirt portion of the one of the adjacent U-packings and the outer side skirt portion of the other of the adjacent U-packings do not interfere with each other, the U-packings are made of a fluorine resin, a first guide bush and a second guide bush, both of said guide bushes being configured to guide the rod in a manner that the rod is movable in the axial direction is attached to the holder, and a scraper is mounted between a pressing plate attached to the holder and the first guide bush, and the plurality of U-packings are mounted between the scraper and the first guide bush, and an auxiliary packing made of rubber mounted between the first guide bush and the second guide bush.

8. The shaft sealing structure according to claim 1, wherein the scraper is made of an engineering plastic material.

9. The shaft sealing structure according to claim 3, wherein the scraper is made of an engineering plastic material.

10. The valve according to claim 6, wherein the scraper is made of an engineering plastic material.

11. The valve according to claim 7, wherein the scraper is made of an engineering plastic material.

12. The shaft sealing structure according to claim 8, wherein the pressing plate is ring shaped and an inner diameter of the pressing plate is greater than an inner diameter of the scraper.

13. The shaft sealing structure according to claim 9, wherein the pressing plate is ring shaped and an inner diameter of the pressing plate is greater than an inner diameter of the scraper.

14. The valve according to claim 10, wherein the pressing plate is ring shaped and an inner diameter of the pressing plate is greater than an inner diameter of the scraper.

15. The valve according to claim 11, wherein the pressing plate is ring shaped and are e diameter of the pressing plate is greater than an inner diameter of the scraper.

* * * * *